United States Patent [19]

Schuppner, Jr.

[11] 3,770,462

[45] Nov. 6, 1973

[54] COLD MILK CUSTARD-TYPE PUDDING

[75] Inventor: Harry R. Schuppner, Jr., El Cajon, Calif.

[73] Assignee: Kelco Company, San Diego, Calif.

[22] Filed: Oct. 18, 1971

[21] Appl. No.: 189,833

[52] U.S. Cl.................. 426/186, 426/163, 426/214, 426/216, 426/321, 326/380
[51] Int. Cl................................................ A23l 1/04
[58] Field of Search.............................. 99/139, 131

[56] References Cited
UNITED STATES PATENTS
3,365,305   1/1968   Hunter................................. 99/139
3,471,301   10/1969  Mitchell................................ 99/139
3,507,664   4/1970   Schuppner............................ 99/139

Primary Examiner—Alvin E. Tanenholtz
Assistant Examiner—J. M. Hunter
Attorney—Elwood S. Kendrick

[57] ABSTRACT

A composition suitable for forming a cold milk pudding containing as active ingredients in finely divided form about 2 to about 8 parts by weight of sodium phosphoalginate, about 1 to about 4.5 parts by weight of calcium sulfate dihydrate, and about 0.5 to about 3 parts by weight of sodium carbonate in an amount sufficient to solubilize said sodium phosphoalginate in the presence of said calcium sulfate dihydrate. The total content of sodium phosphoalginate, calcium sulfate dihydrate and sodium carbonate ranges from about 5 to about 12.5 parts by weight and the weight ratio of sodium carbonate to calcium sulfate dihydrate ranges from about 1:2 to about 1:4, and an edible antifoaming agent is present in an amount sufficient to prevent undue foaming when said composition is employed in forming a cold milk pudding.

A composition for forming a cold milk pudding containing as active ingredients in finely divided form about 3.5 to about 5 parts by weight of sodium phosphoalginate, about 1 to about 1.5 parts by weight of sodium carbonate, about 2 to about 3 parts by weight of calcium sulfate dihydrate, and an edible antifoaming agent in an amount sufficient to prevent undue foaming when said composition is employed in forming a cold milk pudding.

A method of forming a cold-milk pudding by blending either of the above compositions with a suitable amount of water to solubilize it, and thereafter blending the solubilized composition with a suitable quantity of cold milk.

10 Claims, No Drawings

COLD MILK CUSTARD-TYPE PUDDING

This invention pertains to a composition which may be used in forming a cold milk custard-type pudding. Further, the invention pertains to a method of forming a cold milk custard-type pudding and to the product produced thereby.

Milk is a common food material which is widely used in the home. However, milk is subject to spoilage at ambient temperatures. Thus, it must be kept under refrigeration, i.e., at temperatures in the order of about 35° to about 55° F. When the term "cold milk" is used in describing the present invention, it has reference to milk which has been kept under refrigeration.

Many attempts have been made to formulate a composition which could be utilized in forming a pudding in cold milk due to the fact that milk is customarily kept under refrigeration and is a food material that is commonly used in the household. To my knowledge, such efforts have generally been unsuccessful due to shortcomings in the consistency or taste of the resulting milk gel or pudding. Among the shortcomings of previous procedures are the fact that the resulting milk gel or pudding has a mushy consistency which is not pleasing to the palate. A further drawback in previous procedures is that air is introduced into the milk pudding during its preparation. Due to the introduction of air, the structure of the resulting milk gel or pudding is aerated to provide a product that does not have the characteristically heavier body required in a pudding. In attempting to solve some of these problems, prior workers have increased the quantity of starch in the pudding which has resulted in puddings having an unpleasant starchy consistency.

In solving the above problems, I have devised a composition and method of forming a cold-milk pudding in which the pudding has a firm, crisp consistency without the introduction of undue quantities of air during its preparation to produce an aerated structure. Moreover, the puddings of my invention do not require the use of large quantities of starch. Thus, they have the desired qualities of body and consistency without the undesirable starchy consistency which has characterized many milk puddings of the prior art.

The composition which I employ in forming my milk puddings is composed of sodium phosphoalginate, sodium carbonate, calcium sulfate, and a suitable quantity of an edible anti-foaming agent, all blended together in a finely divided state. Sodium phosphoalginate is an incorporated product and is formed by the wet blending of sodium alginate with a water-soluble salt of phosphoric acid. To illustrate the manufacturing process, a quantity of alginic acid is first placed in a suitable mixer. The alginic acid usually contains about 85 percent to about 90 percent water and has a fibrous character. Soda ash is then added to the alginic acid in the mixer in a suitable quantity to produce, when thoroughly mixed therewith, a sodium alginate paste having a pH of about 7. In adding the soda ash, it is preferably dusted into the mixer to aid in its uniform distribution throughout the reaction mass. Following addition of the soda ash, or other neutralizing agent, such as sodium hydroxide, the mixing of the reaction mass is continued for a sufficient time, e.g., about 20 minutes, to insure conversion of all of the alginic acid into a sodium alginate paste.

To the sodium alginate paste is then added a phosphate such as disodium phosphate, monosodium phosphate, trisodium phosphate or mixtures thereof. Preferably, the phosphate which is added is trisodium phosphate. The anhydrous weight of trisodium phosphate may be equal to approximately 1/8th of the anhydrous weight of the alginic acid. The trisodium phosphate is added in dry form as $Na_3PO_4 \cdot 12H_2O$ or $Na_3PO_4$. After addition of the phosphate, it is mixed into the paste until it has thoroughly dissolved therein and has reacted, which generally takes about 10 minutes. Sugar or an other suitable agent, such as dextrin for increasing the solubility of the resultant material, may be added in a manner similar to that of the phosphate.

The resultant sodium phosphoalginate mixture may then be removed from the mixing vessel and spread onto trays and dried. The sodium phosphoalginate may be dried by any suitable means. The dried material may contain about 5 percent to 15 percent by weight of water and, after drying, the material is ground and screened. Preferably, the particle size of the dried material is finer than about 80 mesh (Tyler Standard Screen). The pH of the finished material in a 1 percent by weight water solution should preferably be above about 7.5 and the minimum ratio of anhydrous trisodium phosphate to anhydrous alginic acid in the product should be about 1:16.

The compositions of my invention contain as active ingredients about 2 to about 8 parts by weight of sodium phosphoalginate, as described above. In admixture with the sodium phosphoalginate in finely divided form is about 1 to about 4.5 parts by weight of calcium sulfate dihydrate and about 0.5 to about 3 parts by weight of sodium carbonate in an amount sufficient to solubilize the sodium phosphoalginate in water in the presence of the calcium sulfate dihydrate. The total content of sodium phosphoalginate, calcium sulfate dihydrate and sodium carbonate ranges from about 5 to about 12.5 parts by weight and the weight ratio of sodium carbonate to calcium sulfate dihydrate ranges from about 1:2 to about 1:4. An edible antifoaming agent is also present in an amount sufficient to prevent undue foaming when the composition is used in forming a cold milk pudding. Various edible antifoaming agents may be used, such as, for example, a dimethylpolysiloxane emulsion on an inert carrier (Hodag HC–401, manufactured by Hodag Chemical Corporation, 7247 North Central Park Avenue, Skokie, Illinois), or a dry powder containing 62 percent by weight of emulsified fat on a vegetable gum gum carrier (Beatreme 1126 manufactured by Beatrice Foods, 1526 South State Street, Chicago, Illinois 60605). I found that a suitable level of Hodag HC-401 may be about 15 parts per million based on the total weight of my composition.

In a preferred form of my invention, my composition contains in finely divided form about 3.5 to about 5 parts by weight of sodium phosphoalginate, about 1 to about 1.5 parts by weight of sodium carbonate, and about 2 to about 3 parts by weight of calcium sulfate dihydrate with the total amount of sodium phosphoalginate, sodium carbonate and calcium sulfate dihydrate ranging from about 6.5 to about 9.5 parts by weight. Also present is an edible antifoaming agent, as defined above, and a suitable level of Hodag HC-401 may be about 15 parts per million based on the total weight of the composition.

In utilizing either of my compositions to form a cold milk pudding, the composition is first added to tap water and solubilized by mixing at slow speed. Following this, cold milk is added and mixing is continued for an additional short period such as about one-half to 4 minutes after which the mixture is poured into a suitable container and is refrigerated until chilled. The pudding is then ready to eat in about 45 minutes. The time of mixing following the addition of cold milk is not critical. Sufficient time is required only to insure complete and uniform blending of the water and milk phases.

The amount of water which is initially blended with my compositions to solubilize them may range from about ¼ cup to about 2 cups and preferably about ½ cup for about 5 to about 12.5 grams of the active ingredients in the composition. In the case of my preferred compositions, about 6.5 to about 9.5 grams of the active ingredients are present for each about ¼ to about 2 cups, and preferably about ½ cup, of water. In mixing my compositions with water and later with the cold milk, the mixing may be conducted with an electric mixer operating at its slowest speed, using a typical home-type mixer, e.g., a Hamilton Beach Model K dual beater electric mixer, i.e., at a shear rate of about 300 to about 500 r.p.m. The mixing time in cold water may also be varied and can range from as long as about one minute up to as high as about seven minutes. The mixing time employed for solubilization of my composition in water should not exceed about seven minutes since I have found that when mixing times were employed in excess of about seven minutes the product did not set up properly after addition of the cold milk for forming a milk pudding.

With mixing times in water in excess of about seven minutes, there was some gel formation in the water prior to addition of the milk. When the milk was then added, the blending in of the milk caused a breaking of the previously-formed gel structure. This resulted in an unsatisfactory milk pudding.

The next step in my process is to blend cold milk with my water-solubilized compositions, as defined above. The quantity of cold milk may be varied and may range from about 1 cup to 1¾ cups and preferably about 1½ cups for about 5 to about 12.5 grams of the active ingredients, or about 6.5 to about 9.5 grams of the active ingredients in my preferred compositions. Generally, the ratio of the quantity of water with respect to the quantity of milk used is maintained within the weight range of about 1:7 to about 1:1, and preferably about one part by weight of water is employed for each three parts by weight of milk. The total quantity of milk and water used in my process is preferably equal to about 2 cups for about 5 to about 12.5 grams of the active ingredients in my composition, or about 6.5 to about 9.5 grams of the active ingredients in the case of my preferred compositions.

In order to further illustrate my invention, the following example is presented of a cold milk custard of my invention.

EXAMPLE 1

A dry mix composition is formed by blending the following ingredients in the following amounts:

| | |
|---|---|
| Sodium phosphoalginate | 4.00 grams |
| Sodium carbonate | 1.00 grams |
| Calcium sulfate . 2H₂O | 2.50 grams |
| Vanilla flavoring | 0.50 grams |
| An edible antifoaming agent (Beatreme 1126) | 1.00 grams |
| Salt | 0.50 grams |
| Sugar | 70.00 grams |
| F.D. & C.Yellow No. 5 | 0.02 grams |
| F.D. & C. Yellow No. 6 | 0.005 grams |

After blending the above materials to substantial homogeneity, the mixture was added to ½ cup of cold tap water in a small mixing bowl and mixed into the water at slow speed with an electric mixer for three minutes. There was then added 1 ½ cups of cold milk and mixing was continued for an additional 2 minutes. Following this, the mixture was poured into a suitable container and refrigerated until chilled. The resulting cold milk pudding was ready to eat in about 45 minutes and had a firm, crisp consistency.

As demonstrated in the foregoing Example, conventional flavoring ingredients, e.g., salt, vanilla flavoring and sugar and sweetening ingredients, such as mannitol, sorbitol, sodium saccharin, calcium saccharin and the like may be present in my composition in any desired amounts. Also, my composition may contain thickeners and surfactants such as starch, polysorbates or a xanthan gum or various food coloring ingredients in amounts sufficient to impart the desired color to the resulting cold-milk pudding.

The amount of the sweetening ingredient which is admixed with the active ingredients of my compositions to form a dry mix milk pudding formulation may form a major part of the pudding formulation. Thus, for example, in the use of sugar as a sweetener, the sugar content may, for example, range from about 60 to about 90 percent by weight of the pudding formulation including the active ingredients in my compositions. If an artificial sweetener, such as sodium saccharin is used, it will be present at a lower concentration with the result that the active ingredients of my composition will make up a larger percentage of the dry mix pudding formulation.

I claim:

1. A composition suitable for forming a cold milk pudding, said composition containing as active ingredients in finely divided form about 2 to about 8 parts by weight of sodium phosphoalginate, about 1 to about 4.5 parts by weight of calcium sulfate dihydrate, and about 0.5 to about 3 parts by weight of sodium carbonate in an amount sufficient to solubilize said sodium phosphoalginate in the presence of said calcium sulfate dihydrate, the total content of sodium phosphoalginate, calcium sulfate dihydrate and sodium carbonate ranging from about 5 to about 12.5 parts by weight and the weight ratio of sodium carbonate to calcium sulfate dihydrate ranging from about 1:2 to about 1:4, and an edible antifoaming agent in an amount sufficient to prevent undue foaming when said composition is employed in forming a cold milk pudding.

2. A method of forming a cold-milk pudding, said method comprising adding the composition of claim 1 to water in an amount sufficient to provide about 5 to about 12.5 grams of said active ingredients for about ¼ to about 2 cups of water;

mixing said composition with said water for about one to about seven minutes at a low shear rate to form a water mixture;

blending said water mixture with cold milk for a short period of time at a low shear rate, the quantity of cold milk ranging from about one to about 1¾ cups for about 5 to about 12.5 grams of said active ingredients, and the weight ratio of said cold milk to said water ranging from about 1:1 to about 7:1, and chilling the resulting mixture until it has set to form a milk pudding.

3. The method of claim 2 wherein the weight ratio of said water to said milk is about 1:3.

4. The method of claim 2 wherein about ½ cup of water is present for each about 5 to about 12.5 grams of said active ingredients in said composition.

5. The method of claim 3 wherein about ½ cup of water and about 1½ cups of cold milk are present for each about 5 to about 12.5 grams of said active ingredients in said composition.

6. A composition suitable for forming a cold milk pudding, said composition containing as active ingredients in finely divided form about 3.5 to about 5 parts by weight of sodium phosphoalginate, about one to about 1.5 parts by weight of sodium carbonate, about 2 to about 3 parts by weight of calcium sulfate dihydrate and an edible antifoaming agent in an amount sufficient to prevent undue foaming when said composition is employed in forming a cold milk pudding, with the total of said sodium phosphoalginate, sodium carbonate and calcium sulfate dihydrate ranging from about 6.5 to about 9.5 parts by weight.

7. A method of forming a cold-milk pudding, said method comprising adding the composition of claim 6 to water in an amount sufficient to provide about 6.5 to about 9.5 grams of said active ingredients for each about ¼ to about 2 cups of water;

mixing said composition with said water for about one to about seven minutes at a low shear rate to form a water mixture;

blending said water mixture with cold milk for a short period of time at a low shear rate, the quantity of cold milk ranging from about one to about 1 ¾ cups for about 6.5 to about 9.5 grams of said active ingredients, and the weight ratio of said cold milk to said water ranging from about 1:1 to about 7:1, and chilling the resulting mixture until it has set to form a milk pudding.

8. The method of claim 7 wherein the weight ratio of said water to said milk is about 1:3.

9. The method of claim 7 wherein about ½ cup of water is present for each about 6.5 to about 9.5 grams of said active ingredients in said composition.

10. The method of claim 9 wherein about ½ cup of water and about 1½ cups of cold milk are present for each about 6.5 to about 9.5 grams of said active ingredients in said composition.

* * * * *